Aug. 19, 1969  L. R. YAUNEY ET AL  3,461,586
METHOD OF AND TAG FOR IDENTIFYING ANIMALS
Filed May 4, 1967  2 Sheets-Sheet 1

*INVENTORS:*
LLOYD R. YAUNEY
ROWLAND W. RIDER
EDWIN Q. CANNON, JR.
BY: *Mallinckrodt and Mallinckrodt*
ATTORNEYS.

Aug. 19, 1969  L. R. YAUNEY ET AL  3,461,586
METHOD OF AND TAG FOR IDENTIFYING ANIMALS
Filed May 4, 1967  2 Sheets-Sheet 2

*INVENTORS:*
LLOYD R. YAUNEY
ROWLAND W. RIDER
EDWIN Q. CANNON, JR.
BY: *Mallinckrodt and Mallinckrodt*
ATTORNEYS.

United States Patent Office 3,461,586
Patented Aug. 19, 1969

3,461,586
METHOD OF AND TAG FOR IDENTIFYING ANIMALS
Lloyd R. Yauney, Ashby, Nebr. 69333, and Rowland W. Rider and Edwin Q. Cannon, Jr., Salt Lake City, Utah; said Rider and said Cannon assignors to said Yauney
Filed May 4, 1967, Ser. No. 636,066
Int. Cl. G09f 3/06
U.S. Cl. 40—300    5 Claims

ABSTRACT OF THE DISCLOSURE

A method of identifying animals by attaching easily observed identification tags to their noses, and a tag for such purpose having a clasp adapted to be passed through the tissue between animal nostrils and having a body portion on which clearly observable identification marking can be placed.

BRIEF SUMMARY OF THE INVENTION

This invention relates to a method of identifying cattle and other livestock and to a tag to be used for the purpose.

In the past numerous animals, birds and fish, have been marked for identification in various ways. One way has been to attach an identification tag to an ear flap, tail, brisket, neck, wing, or fin or to some other such body portion of the species being marked. However, since the body portions heretofore marked are relatively insensitive, the animal will frequently pull the tag loose after it has become caught in a fence or in some other manner.

It is an object of the present invention to provide a method of tagging cattle and other livestock such that the animals will not pull or jerk the tag free and to provide a tag particularly adapted for use in practicing the method.

In accordance with the method of the invention a tag is attached to a cow or other animal to be identified by affixing it to the animal's nose. This is done by inserting a clasp portion of the tag through the thin, relatively soft tissue that separates the animal's nostrils, and by fixing a body portion having a desired identification marking thereon to the clasp in such a manner that the marking is easily viewed.

Distinct advantages have been noted when an animal is marked by affixing a tag to his nose that are not achieved by affixing tags to other body parts of the animals. For example, hair does not grow on an animal's nose to obscure viewing of the mark on the body portion of the tag. Also, an animal's nose is sensitive and should the tag become entangled he will not pull hard enough to release or tear the tag, and since the animal is less likely to put its sensitive nose in places where the tag will get caught, a larger, more easily observed tag can be used. Furthermore, a cow or other animal will usually raise its head to look at an approaching person thus raising the tag, so that a marking thereon can be easily viewed.

The tag of the invention may be made in one piece, but as will be apparent, separate clasps and body portions can be used and they can be affixed to one another in a variety of different ways.

There is shown in the accompanying drawings specific embodiments of the invention representing what are presently regarded as the best modes of carrying out the generic concepts in actual practice. From the detailed description of these presently preferred forms of the invention, other more specific objects and features will become apparent.

THE DRAWINGS

Figure 1:
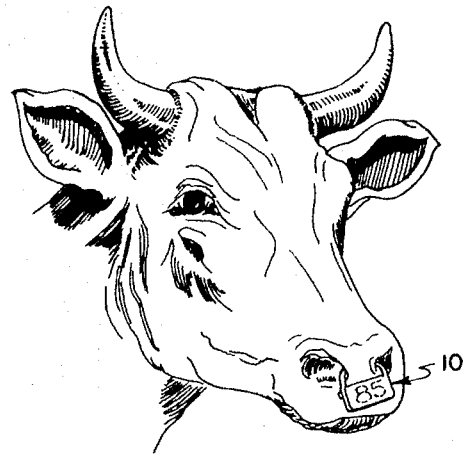
Figure 2:
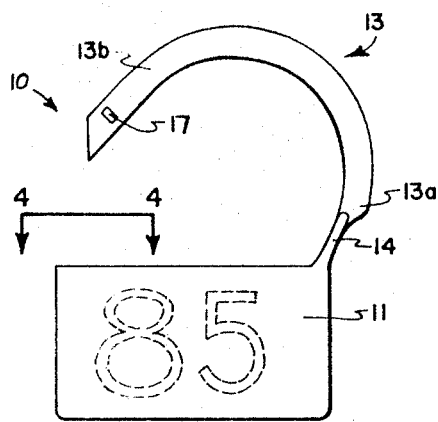

FIG. 1 is a perspective view of the identification tag of the invention, as used to mark a cow;

FIG. 2, a front elevation view of the tak, with the clasp portion unlatched.

Figure 3:
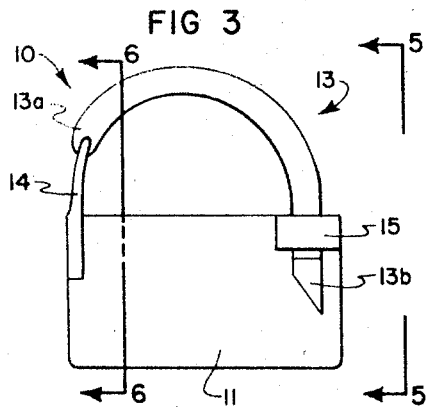
Figure 4:
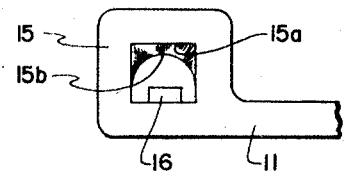
Figure 5:
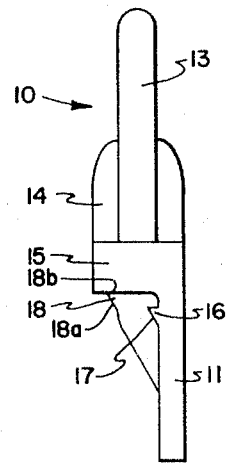
Figure 6:
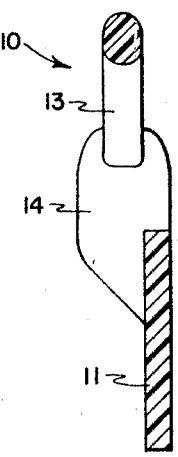
Figure 7:
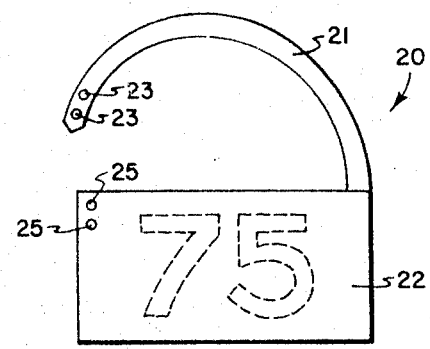
Figure 8:
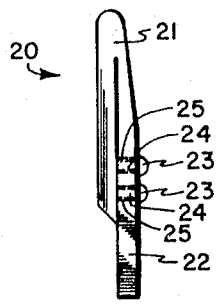
Figure 9:
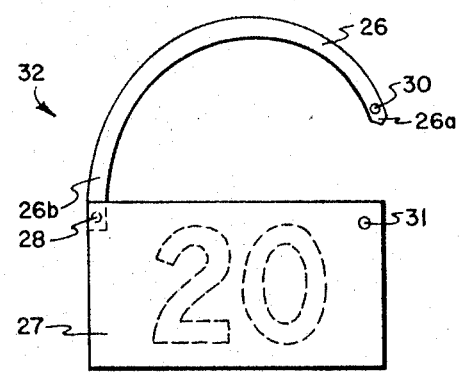
Figure 10:
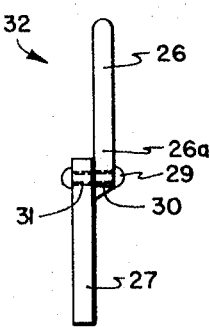
Figure 11:
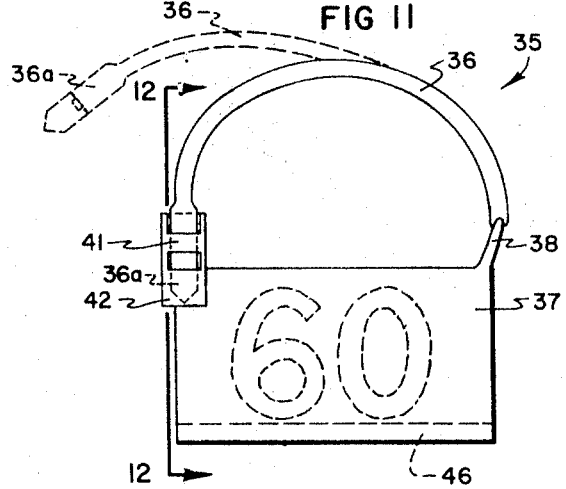

FIG. 3, a rear elevation view with the clasp portion latched;

FIG. 4, an enlarged, fragmentary, horizontal section, taken on the line 4—4 of FIG. 2;

FIG. 5, an end elevation view, taken on the line 5—5 of FIG. 3;

FIG. 6, a fragmentary vertical section, taken on the line 6—6 of FIG. 3;

FIG. 7, a side elevation view of another embodiment of the invention, with the nose clasp unlatched;

FIG. 8, an end elevation view of the embodiment shown in FIG. 7, but with the nose clasp latched;

FIG. 9, a side elevation view of yet another embodiment of the invention, with the nose clasp shown unlatched;

FIG. 10, an end elevation view of the embodiment of the invention shown in FIG. 9, but with the nose clasp shown latched;

FIG. 11, a side elevation of still another embodiment of the invention; and

Figure 12:
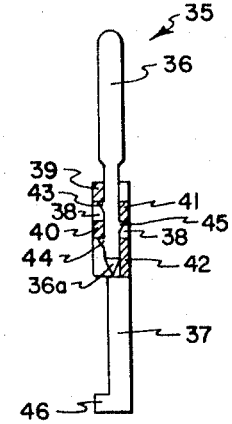

FIG. 12, a vertical section view taken on the line 12—12 of FIG. 11.

DETAILED DESCRIPTION

Referring now to the drawings: In the embodiment illustrated in FIGS. 1-6, the identification tag, shown generally at 10, includes a large, preferably flat, body portion 11, on which a numeral or other identification mark is adapted to be imprinted.

A clasp 13, which is substantially rigid, is connected at one of its ends 13a to the body portion 11, by a hinge 14. The other end 13b of the clasp is sharpened, so that it will more easily penetrate animal tissue as the tag is fastened in place.

In this embodiment, the body portion, clasp, and hinge are all made of plastic and are formed integral. The hinge is made by flattening a portion of the clasp, with excess width extending outwardly from body portion 11 and being provided, as shown in FIGS. 5 and 6, in the direction transverse to the pivoting motion of the clasp, to provide additional strength.

The pointed end of the clasp is adapted to be passed through a collar 15, formed on the back of the body portion, and to then be held against withdrawal by a projection 16 on the body portion that fits into a recess 17 on the clasp and by a projection 18 on the clasp that extends beneath the collar 15.

Collar 15 is constructed to have a large receiving opening 15a, FIG. 4, that decreases in size to a reduced exit opening 15b that is preferably of arcuate configuration. Thus, the pointed end 13b of clasp 13 can be readily inserted into the collar and as pressure is applied the plastic material will deform sufficiently to allow projection 18 to be forced through the reduced exit. The inclined surface 18a of projection 18 acts as a guiding wedge and the projection is preferably arcuately shaped in the same manner as the exit opening 15b but made considerably larger to resist withdrawal. Once through the collar the projection 18 will resume its original shape and an abrupt surface 18b of the projection will then engage the bottom surface of collar 15 to resist withdrawal. At the same time, projection 16 fits into recess 17 to resist further insertion of clasp 13 into the collar and to assist in preventing withdrawal of the clasp.

Any tendency of the pointed end 13a to move away from the body portion and away from projection 16 simply moves projection 18 more tightly into gripping engagement with the bottom of collar 15, to thereby provide additional resistance to withdrawal of the clasp. Similarly, any froce moving the pointed end 13 more tightly against the body portion and tending to move projection 18 upwardly through the collar also forces projection 16 farther into recess 17 to more forcefully resist withdrawal of the clasp.

In accordance with the method of the invention, the pointed end 13b of clasp 13 is forced through soft tissues separating the nostrils of the animal's nose and through collar 15 to be secured by the double lock consisting of projections 16 and 18, recess 17 and the collar 15. The large body portion is thus positioned in front of the animal's nose for easy viewing of the markings thereon.

In FIGS. 7 and 8, we show, at 20, another embodiment of the tag of the invention. As in the previous embodiment, this tag includes a clasp 21 and a body portion 22, that is enlarged and adapted to have a numeral or other identifying mark placed thereon. In this embodiment, however, the clasp, while being somewhat rigid is sufficiently flexible that it will bend as it is latched and is somewhat resilient. The clasp 21 is latched to the body portion after it has been inserted through the tissue separating the animal's nostrils by inserting the heads 23 of posts 24 carried by the clasp through holes 25 in the body portion. The heads 23 are larger than holes 25, which are larger than the posts 24, but, because of their curved configuration, the heads can be forced through the holes to securely hold the tag in place. The natural resiliency of the clasp places it in tension, when latched, and this further resists unlatching.

In FIGS. 9 and 10, we show still another embodiment of the invention wherein the tag, shown generally at 32, is made up of a clasp 26 that is formed separately from the body portion 27. The clasp 26 is formed of a metal, such as copper, and includes a pointed end 26a to facilitate penetration of animal tissue. Since it will be constantly exposed to body secretions of the animal, the metal used for the clasp must be suitably non-corrosive. The other end 26b of the clasp is adapted to be connected to the body portion, as by a rivet 28, and this connection is preferably made before the clasp is inserted through the tissue separating the nostrils of an animal, but can be made thereafter. In either case, the pointed end is attached to the body portion after the clasp has been positioned, as by a rivet 29, FIG. 10, inserted through holes 30 and 31 in the clasp and body portion, respectively. Obviously, other means could be used in place of the rivets 28 and 29 to secure the clasp to the body portion. For example, bolts, or screws, or combinations of any of these holding means could be used.

In FIGS. 11 and 12 there is shown still another form of the invention. In this embodiment the identification tag, shown generally at 35 includes a clasp 36 and a body portion 37. As in the embodiment of FIGS. 1–6, the clasp and body portion are preferably made integral, of plastic, with a hinge 38 between them. The hinge is formed by flattening that portion of the clasp adjacent to the body portion. The clasp is made relatively rigid to allow it to be inserted through animal tissue and its end 36a is pointed to facilitate penetration.

A pair of spaced collars 39 and 40 are formed to extend outwardly as loops from one broad face of body portion 37 and similar collars 41 and 42, located between the collars 39 and 40 and below collar 40, respectively form loops in the plane of the opposite face of the body portion.

To lock the clasp 36 to the body portion 37 the pointed end is inserted downwardly between the collars 39 and 40 on one side and the collars 41 and 42 on the other.

Abrupt upper surfaces of projections 43 and 44 on one side of the clasp engage the bottom of collars 39 and 40, respectively to prevent withdrawal of the clasp and a similar abrupt surface of a projection 45 on the opposite side of the clasp engages the bottom of collar 41 to also resist withdrawal. The end 36a of clasp 36 rests against collar 42 and does not project such that it can be snagged during activities of the animal on which it is used. The lower surfaces of projections 43, 44 and 45 are inclined and will wedge through the openings formed by the collars and the projections will deform enough to permit locking of the clasp. When the abrupt upper surfaces of the projections engage the bottoms of the collars the clasp is securely held against withdrawal.

Using any of the embodiments of the invention, in accordance with the method of the invention, a clasp of the tag is inserted through the thin tissue separating the nostrils of a cow or other animal to be marked. The clasp is then secured to a body portion having an identifying marking such as the numbers shown in dotted lines on each illustrated body portion, to securely hold the tag in place. While the tags here disclosed each include a clasp having a pointed end that is adapted to penetrate tissue a separate tool may be used to first perforate the tissue through which the clasp is to be inserted, in which case the locking end of the clasp may be somewhat blunted.

In FIGS. 11 and 12 there is also shown a ridge 46 along the lower edge of one face of the body portion 37. This ridge serves as a reinforcement strip along that portion of the face of the tag that is most subject to wear while the animal is grazing. Obviously, such a ridge can be provided on any of the embodiments disclosed, and instead of being formed to have a definite ridge configuration, the lower part of the body portion of the tag can simply be enlarged as desired.

Whereas this invention is here described and illustrated with respect to certain forms thereof, it is to be understood that many variations are possible without departing from the subject matter particularly pointed out in the following claims, which subject matter we regard as our invention.

We claim:

1. An identification tag for animals and the like, comprising a body portion adapted to have an identification mark placed thereon; a substantially rigid clasp having one of its ends hingedly connected to the body portion and its other end pointed for penetrating animal membranes; and means for securely locking the pointed end of the clasp to the body portion, said means including at least one collar affixed to the body portion in position to receive said pointed end of the clasp, and a projection affixed to the clasp adjacent to said pointed end thereof, said projection having a face adapted to abruptly engage the bottom of the collar.

2. An identification tag according to claim 1, wherein the means for securely locking the pointed end of the clasp to the body portion further includes a recess in the clasp, and a projection on the body portion adapted to fit into the recess in the clasp when the projection on the clasp engages the bottom of the collar.

3. An identification tag according to claim 1, wherein the means for securely locking the pointed end of the clasp to the body portion further includes at least one additional collar affixed to the body portion in alignment with the first collar so as to also be in position to receive the pointed end of the clasp, and at least one additional projection on the side of the clasp opposite the first projection, each said additional projection having a face adapted to abruptly engage the bottom of its corresponding additional collar.

4. An identification tag according to claim 1 integrally formed of plastic material.

5. An identification tag for animals and the like, comprising a body portion adapted to have an identification mark placed thereon; a substantially rigid clasp having one of its ends pivotally connected to the body portion and its other end pointed; and means for securely locking the pointed end of the clasp to the body portion, said body portion and said clasp being integrally formed of plastic material, and the means for securely locking the pointed end of the clasp to the body portion including mutually spaced receiving holes in the body portion at the closed location of said pointed end of the clasp, and correspondingly mutually spaced, headed posts projected from said clasp adjacent the pointed end thereof, said clasp being sufficiently flexible to permit bending to align said posts with said receiving holes, and the heads of said posts being larger than the receiving holes whereby they are securely held against withdrawal after being forced into and through said holes.

References Cited

UNITED STATES PATENTS

| | | | |
|---|---|---|---|
| 154,460 | 8/1874 | Decker | 119—135 |
| 1,737,201 | 11/1929 | Reimer | 40—301 |
| 2,924,903 | 2/1960 | Dryden | 40—302 |
| 3,205,602 | 9/1965 | Trinkle | 40—300 |

LAWRENCE CHARLES, Primary Examiner